(12) United States Patent
Sisk, Sr. et al.

(10) Patent No.: US 7,278,808 B1
(45) Date of Patent: Oct. 9, 2007

(54) CARGO WINCH DRIVER

(76) Inventors: Glenn Lewis Sisk, Sr., 267 Camp Creek Rd., Iron Station, NC (US) 28080; Glenn Lewis Sisk, Jr., 267 Camp Creek Rd., Iron Station, NC (US) 28080

( * ) Notice: Subject to any disclaimer, the term of this patent is extended or adjusted under 35 U.S.C. 154(b) by 248 days.

(21) Appl. No.: 11/221,269

(22) Filed: Sep. 7, 2005

(51) Int. Cl.
*B60P 7/00* (2006.01)

(52) U.S. Cl. ............... 410/156; 410/100; 410/103; 279/144

(58) Field of Classification Search .............. 410/12, 410/96, 97, 100, 103, 156; 173/13, 49; 254/223, 254/266, 213, 243; 242/129.3, 394, 390, 242/532; 279/143–145; 81/35, 436, 439, 81/440, 442, 450
See application file for complete search history.

(56) References Cited

U.S. PATENT DOCUMENTS

| | | |
|---|---|---|
| 3,240,473 A | 3/1966 | Coffey et al. |
| 3,954,226 A | 5/1976 | Pickering |
| 4,266,740 A | 5/1981 | Ramos et al. |
| 4,277,286 A | 7/1981 | Boyd et al. |
| 4,311,288 A | 1/1982 | Galland |
| 4,367,993 A | 1/1983 | Meigs ................... 410/103 |
| 4,390,141 A | 6/1983 | Webster |
| 4,510,652 A | 4/1985 | van Iperen |
| 4,900,203 A | 2/1990 | Pope ..................... 410/36 |
| 4,913,608 A | 4/1990 | Royball ................ 410/103 |
| 5,433,565 A | 7/1995 | Chan .................... 410/103 |
| 5,961,061 A | 10/1999 | Stanley |
| 5,975,454 A | 11/1999 | Potter et al. |
| 5,993,127 A | 11/1999 | Shinn ................... 410/100 |
| 6,092,437 A | 7/2000 | Sumner |
| 6,139,233 A | 10/2000 | Wilsey .................. 410/100 |
| 6,729,604 B1 | 5/2004 | Claycomb |
| 6,824,339 B1 * | 11/2004 | Childers ............... 410/103 |
| 6,848,872 B2 | 2/2005 | Perkins, Jr. ........... 410/103 |
| 6,916,143 B2 | 7/2005 | Guenther .............. 410/103 |
| 2004/0155230 A1 | 8/2004 | Fortin |
| 2004/0173707 A1 | 9/2004 | Loudamy |
| 2004/0175248 A1 | 9/2004 | Perkins, Jr. ........... 410/103 |
| 2004/0202520 A1 | 10/2004 | Guenther .............. 410/103 |
| 2005/0092862 A1 | 5/2005 | Treat |

* cited by examiner

*Primary Examiner*—Stephen Gordon
(74) *Attorney, Agent, or Firm*—Michael A. Mann; Nexsen Pruet, LLC

(57) ABSTRACT

A driver for rewinding a cargo winch strap includes a cordless drill and an adapter. The adapter fits into the chuck of the drill and has two movable jaws. The jaws close onto and grip the collar of the cargo winch as soon as the drill is placed into reverse and open to release the collar as soon as the direction of the drill is changed from reverse to forward.

5 Claims, 3 Drawing Sheets

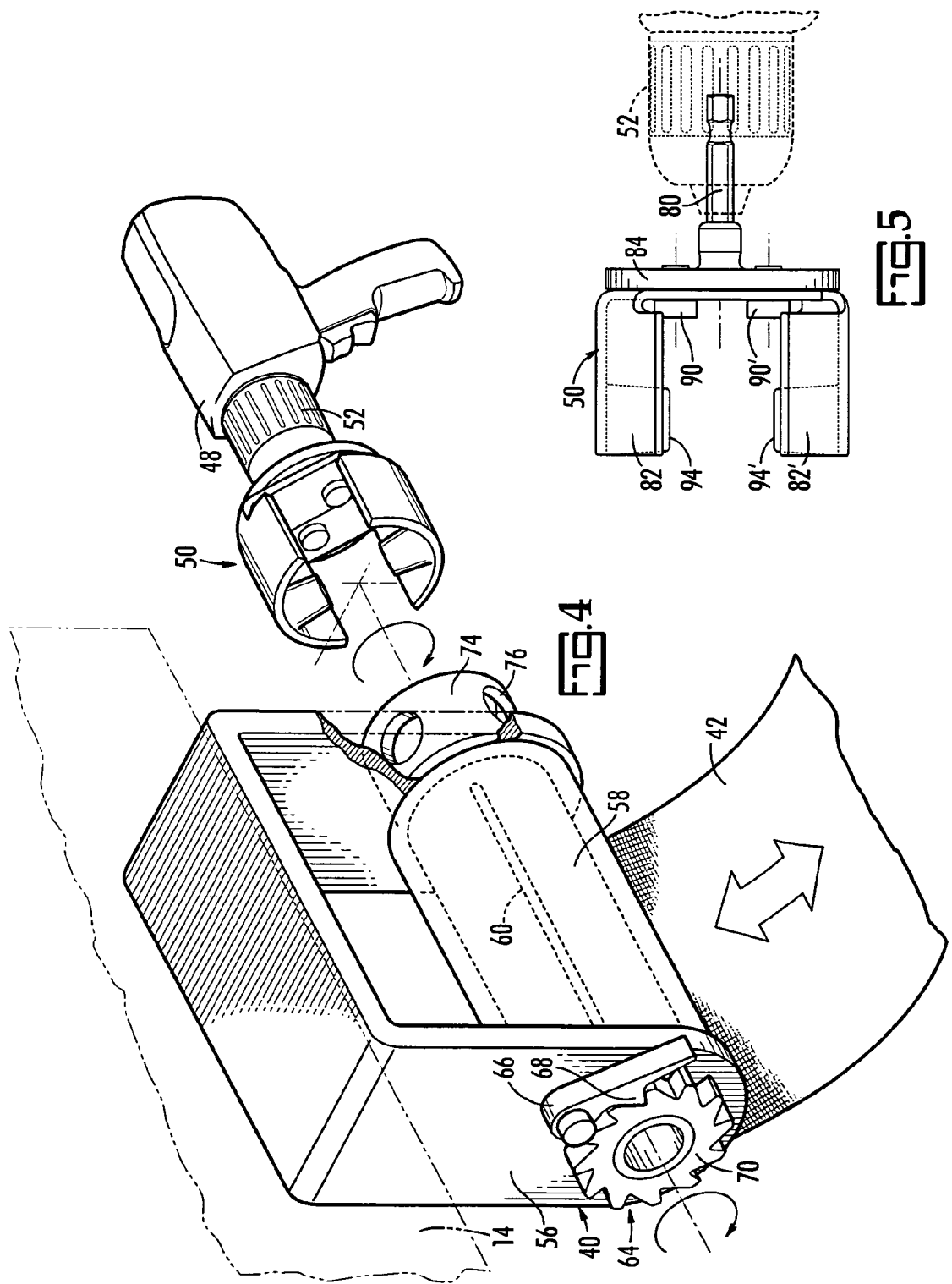

CARGO WINCH DRIVER

BACKGROUND OF THE INVENTION

The present invention relates to a driver for rewinding a cargo winch such as are used in connection with flatbed trailers to strap loads with straps.

Various loads are shipped over highways in closed vans and on flatbed trailers. The loads carried by these different types of trailers are secured in various ways. In order to secure the load onto a flatbed trailer, heavy straps are slung over the load from one side of the trailer to the other are secured using cargo winches. See FIG. 1, which shows in perspective the rear portion of a flatbed trailer with a load of cut lumber secured using typical cargo winches of the type currently in widespread use. FIGS. 2 and 3 show details of the construction of a cargo winch.

Winch 10 includes a bracket 12 that is welded or bolted to the frame 14 of trailer 16, a rotatable sleeve 20 mounted to bracket 12, a ratchet 22 on the left side and a collar 24 on the right side of bracket 12. Collar 24 is used to rotate sleeve 20. Collar 24 has holes 28 formed therein for insertion of a "cheater" bar for greater leverage when the driver tightens straps 30 running over load 34.

To use cargo winch 10, strap 30 is thrown over load 34 from one side of trailer 16 and its end is inserted a slot 36 in sleeve 20 of a cargo winch 10 on the receiving side of trailer 16. Collar 24 is rotated a few turns to take up the slack in strap 30. Then the cheater bar (not shown) is inserted into hole 28 and used to further rotate collar 24 and tighten strap 30.

When trailer 16 has arrived at its destination, strap 30 is loosened from winch 10 and thrown back over load 34. Load 34 is removed from the deck of trailer 16. Then strap 30 is rewound onto winch 10 by rotating collar 24 by hand.

On some trailers there may be 10, 15 or even as many as 20 straps. Rewinding even one strap 30 by hand is a tedious task and will tend to cause forearm muscles to tighten and cramp.

The prior art shows a variety of hand cranks for rewinding cargo straps and one instance of a cordless drill with an adapter that fits into collar 24. The adapter has a spring-loaded detent that must be depressed in order to insert the adapter into collar 24. Once adapter is inserted, the push-button then springs out to seat itself into a hole 28 in collar 24. To remove the adapter, the detent must be pressed in far enough to allow the adapter to slide clear of the hole and be removed from collar 24.

Thus there remains a need for a better, quicker way to rewind cargo straps onto the cargo winch.

SUMMARY OF THE INVENTION

According to its major aspects and briefly recited, the present invention is a driver for rewinding a cargo winch strap onto the cargo winch. The driver includes a drill with a chuck and an adapter that fits into the chuck. Preferably, the drill is cordless for convenience. Importantly, unlike the prior art adapter, the present adapter is not inserted into the collar of the cargo winch but closes down onto and grips the collar as soon as the drill is operated in reverse and it opens to release the collar as soon as the direction of drill operation is changed from reverse to forward.

Adapter has a pair of jaws, each jaw having one tooth that is dimensioned to seat itself into a hole on the collar of the cargo winch as the drill starts moving into reverse and the closing jaws engage the collar, thus gripping the collar securely and without any particular effort on the part of the user to bring the teeth of the two jaws into registration with the holes on the collar first. Similarly, as soon as the direction of rotation of the drill is changed from reverse to forward, the jaws pivot open automatically and the collar is released from their grip. Drill and adapter are then ready to rewind the next strap.

An important feature of the present invention is the pair of jaws on the adaptor that are designed to pivot to a closed position when the rotated in a counter-clockwise or reverse direction and to pivot to an open when rotated in a clockwise direction advantage of this feature is that it allows the jaws to rotate the winch in a direction that rewinds the strap and release it when rotated in the opposite direction.

These and other features and their advantages will be apparent to those skilled in the art of cargo winch operation from a careful reading of the Detailed Description of Preferred Embodiments accompanied by the following drawings.

BRIEF DESCRIPTION OF THE SEVERAL VIEWS OF THE DRAWINGS

In the drawings,

FIG. 4 illustrates a prior art cargo winch with strap attached and a cargo winch driver system, according to a preferred embodiment of the present invention.

FIG. 5 is a detailed side view of the adapter for use with a conventional cordless drill, according to a preferred embodiment of the present invention.

DETAILED DESCRIPTION OF THE INVENTION

Figure 1:
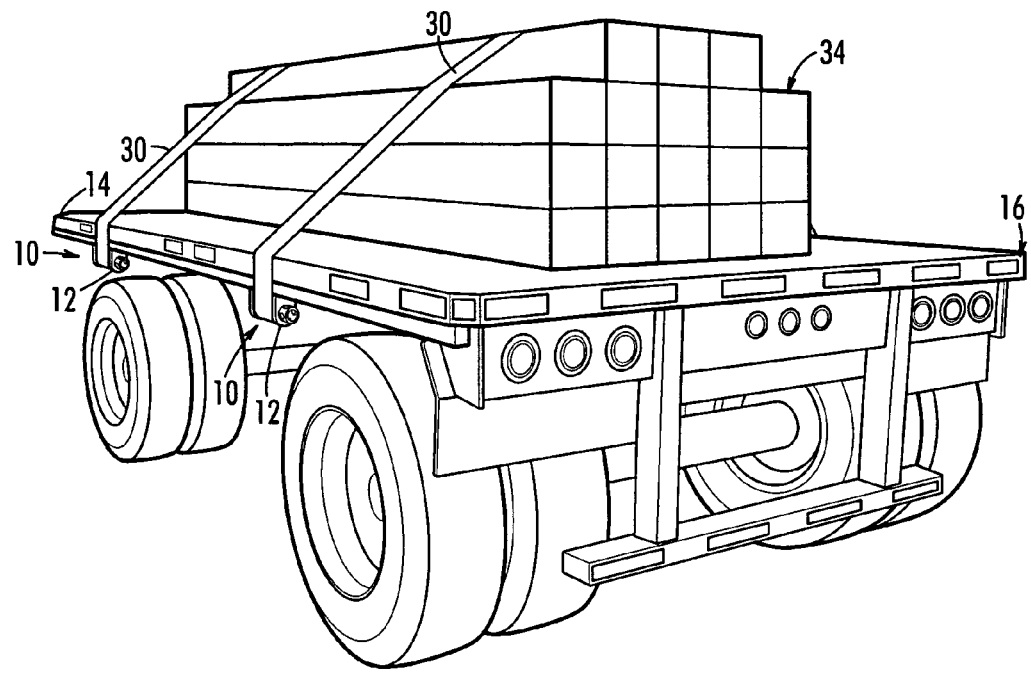
FIG. 1 is a perspective view from the rear of a trailer with a load, according to the prior art.
Figure 2:
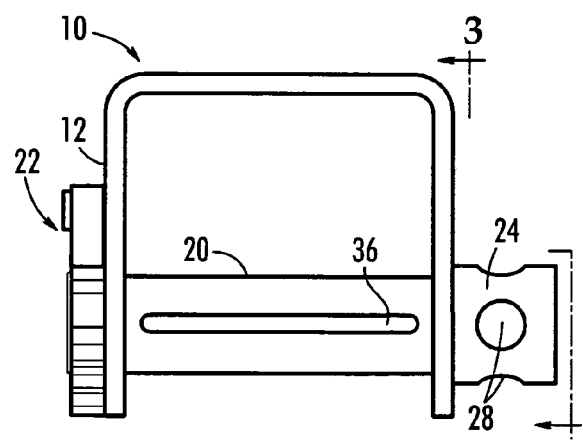
FIG. 2 is a side view of a cargo winch without the strap, according to the prior art.
Figure 3:
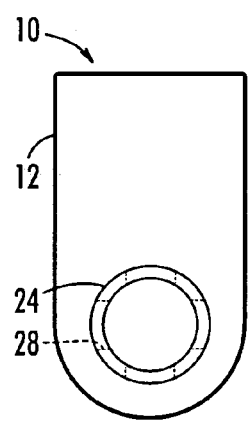
FIG. 3 is an end view of a cargo winch, according to the prior art.

The present invention is a driver for a cargo winch. The cargo winch is not part of the present invention but is the part of a cargo trailer on which the driver operates to rewind the strap after the trailer has been unloaded or when the strap is no longer needed to secure a load.

The present driver comprises a drill and adapter, and an adapter for use with a drill. The drill, whether a component of the invention or when merely used with the present invention is preferably cordless; that is, it is operated by a battery to avoid the need for a cord to connect it to an electrical or hydraulic power source.

Referring now to FIG. 4, there is illustrated in perspective a prior art cargo winch 40 with a cargo strap 42 attached thereto and a cordless drill 48 with the present adapter 50 held in the chuck 52 of drill 48. FIG. 5 illustrates in a side view the detailed construction of adapter 50 seated in chuck 52, which is shown in phantom lines.

Cargo winch 40 comprises a U-shaped bracket 56 that is bolted or welded to a trailer (not shown in FIG. 4). Bracket 56 carries a rotatable sleeve 58 with a slot 60 formed therein. A ratchet 64 on the side of bracket 56 enables sleeve 58 to rotate counter-clockwise when seen from the end but not clockwise unless ratchet handle 66 is lifted by the user to clear ratchet tooth 68 from toothed gear 70.

Opposite ratchet 64 is a collar 74 having at least two holes 76 formed therein. It will be clear that strap 42 can be rewound onto sleeve 58 by rotating sleeve counter-clockwise. It will also be clear that when drill 48 is operated in reverse (say, for loosening a screw), it will rotate counter-clockwise when seen from the chuck end. Thus, for rewinding strap 42 onto sleeve 58, drill 48 must be operated in reverse to cause collar 74 to rotate counter-clockwise.

Adapter has a bit stem 80 on a first end and two jaws 82, 82' on the opposing end. Bit stem 80 is secured to a first side of a plate 84; jaws 82, 82' are rotatably secured to the opposing side of plate 84 by pivot pins 90, 90'. Plate 84 has a central axis defined by the plane plate 84 is in. When plate 84 is rotated by drill 48, it rotates about this central axis. Pivot pins 90, 90', on the other hand, are attached eccentrically; that is, they are attached equal distances away from central axis and rotate about axes through each pivot pin 90, 90'. Each jaw 82, 82' pivots freely about its pivot pin 90, 90' but is constrained within the pivot plane only by the other jaw. Jaws 82, 92', meet at an interface whether rotated clockwise or counter-clockwise. Each jaw 82, 82' has one tooth 94, 94', which is dimensioned to be receivable within one of the holes 76 and is preferably tapered and beveled for ease in seating itself in hole 76.

Figure 6A:
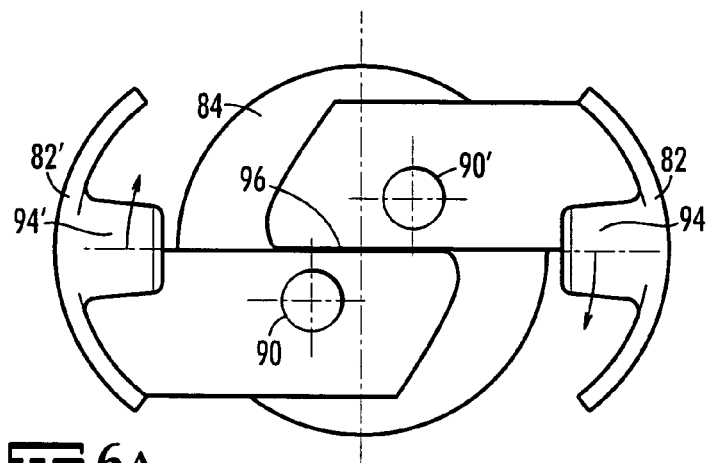
FIGS. 6A-6C illustrate the operation of the jaws of the present adapter in sequence when first operated in reverse, according to a preferred embodiment of the present invention.
Figure 6B:
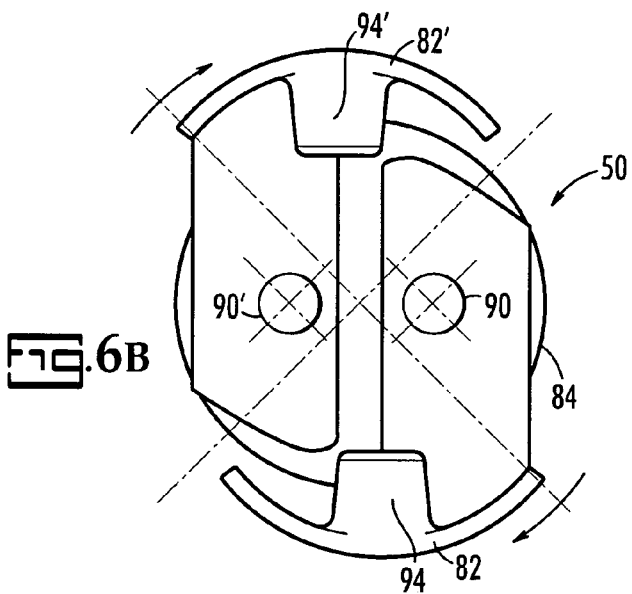
Figure 6C:
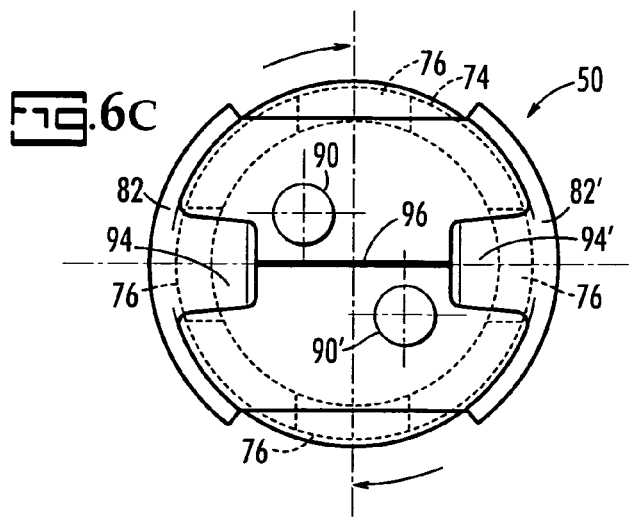

FIGS. 6A, 6B and 6C illustrate the pivoting movement of jaws 82, 82' on plate 84 as plate 84 is rotated about its central axis by drill 48. Note in FIG. 6A that jaws 82, 82' are attached to plate 84 by pins 90, 90' in a way that is both eccentric with respect to the center axis of plate 84 and with respect to their centers of mass. Accordingly, when plate 84 is begins to rotate counter-clockwise (FIG. 6A to FIG. 6B to FIG. 6C), jaw 82 is moves from being radially outward to radially inwardly in the plane of rotation as it rotates about pin 90 and with plate 84. It thus moves from an open position to a closed, gripping position. As plate 84 continues to rotate, however, jaw 82 cannot rotate further than the closed position because it is constrained by the centrifugal force and by the interface of jaw 82' along face 96 (as well as the resistance of collar 74). Jaw 82' behaves in a symmetric way.

As jaws 82, 82' rotate inwardly, they close and thus engage collar 74 as teeth 94, 94' slide into holes 76. Importantly, because centrifugal force is pulling jaws 82, 82' inward when drill 48 is operated in reverse, there is no difficulty if collar 74 has to rotate slightly for holes 76 to come into registration with teeth 94, 94'. Collar 74 easily holds open jaws 82, 82' until teeth 94, 94' find their mark and seat in holes 76. Thus, the operator of the present driver does not need to accurately position adaptor 50 to apply it to collar 74 or to remove it, unlike prior art adapters for rewinding cargo winch straps. The present device is therefore much quicker and the user's hands are safer from injury.

Similarly, when plate 84 is rotated clockwise, pin 90 is rotated clockwise about the central axis of plate 84 and, accordingly, jaw 82 rotates about pin 90 in the same direction until interface 96 again constrains further rotation. As it rotates, jaws 82, 82' move to the open position, releasing collar 74 as teeth 94, 94' clear holes 76.

Accordingly, in rewinding a number of straps 42 onto their respective cargo winches 40, the user inserts bit stem 80 of adapter 50 into chuck 52 of drill 48 and tightens chuck 52. Then drill 48 is operated briefly in the forward clockwise direction to open jaws 82, 82'. The user then moves adapter 50 over collar 74 and reverses the direction of drill 48 from clockwise to counterclockwise to cause jaws 82, 82' to close onto collar 74 and their teeth 94, '94' to seat into holes 76, thereby gripping collar 74 and causing it to rotate in a direction that will rewind strap 42. Once strap 42 is completely rewound, the direction of drill 48 is again changed from reverse to forward to open jaws 82, 82' and free teeth 94 from holes 76. The user then proceeds to the next strap 42 until all are rewound.

It is intended that the scope of the present invention include all modifications that incorporate its principal design features, and that the scope and limitations of the present invention are to be determined by the scope of the appended claims and their equivalents. It also should be understood, therefore, that the inventive concepts herein described are interchangeable and/or they can be used together in still other permutations of the present invention, and that other modifications and substitutions will be apparent to those skilled in the art from the foregoing description of the preferred embodiments without departing from the spirit or scope of the present invention.

What is claimed is:

1. A driver for use with a cargo winch, said device comprising:
   a drill having a chuck; and
   an adapter having
      a plate having a first side and an opposing second side,
      a bit stem carried by said first side of said plate and being receivable in said chuck of said drill so that said drill can rotate said plate when said chuck is rotated, and
      a pair of jaws carried by said second side of said plate, each jaw of said pair of jaws being pivotally attached off center of said plate, said pair of jaws being rotatable between a closed position and an open position when said plate is rotated, said pair of jaws rotating to said closed position when said drill rotates said plate in a first direction and to said open position when said drill rotates said plate in an opposing direction.

2. The driver as recited in claim 1, wherein said cargo winch has a collar and wherein, when said pair of jaws are in said closed position, said pair of jaws grips said collar.

3. The driver as recited in claim 1, wherein said pair of jaws has means formed thereon for gripping said cargo winch so that, when said plate is rotated to move said pair of jaws to said closed position, said pair of jaws grips and rotates said winch.

4. The driver as recited in claim 1, wherein said cargo winch has a collar with at least two holes formed therein, and wherein said each jaw carries a tooth adapted to be received in one hole of said two holes when said pair of jaws rotates to said closed position and to be lifted clear of said one hole when said pair of jaws rotates to said open position.

5. The driver as recited in claim 1, wherein said first direction is reverse and said opposing direction is forward.

* * * * *